(12) United States Patent
DeWaard

(10) Patent No.: US 11,240,952 B2
(45) Date of Patent: Feb. 8, 2022

(54) ALLEY VACUUM DUMPING RECEPTACLE FOR MANURE DILUTION

(71) Applicant: DARI-TECH, INC., Lynden, WA (US)

(72) Inventor: David C. DeWaard, Lynden, WA (US)

(73) Assignee: Dari-Tech, Inc., Lynden, WA (US)

( * ) Notice: Subject to any disclaimer, the term of this patent is extended or adjusted under 35 U.S.C. 154(b) by 27 days.

(21) Appl. No.: 16/837,705

(22) Filed: Apr. 1, 2020

(65) Prior Publication Data
US 2021/0307237 A1   Oct. 7, 2021

(51) Int. Cl.
*A01C 3/02*   (2006.01)
*C02F 9/00*   (2006.01)
*A01C 3/06*   (2006.01)
*C02F 101/30*   (2006.01)
*C02F 103/20*   (2006.01)

(52) U.S. Cl.
CPC ............... *A01C 3/026* (2013.01); *A01C 3/06* (2013.01); *C02F 9/00* (2013.01); *C02F 2101/30* (2013.01); *C02F 2103/20* (2013.01); *C02F 2301/08* (2013.01); *C02F 2303/24* (2013.01)

(58) Field of Classification Search
USPC ........... 209/10, 173; 15/328, 340.1; 210/600
See application file for complete search history.

(56) References Cited

U.S. PATENT DOCUMENTS

| | | | | |
|---|---|---|---|---|
| 5,720,393 | A * | 2/1998 | Wedel | B03B 5/02 209/13 |
| 5,957,301 | A * | 9/1999 | Wedel | B03B 5/62 209/173 |
| 6,531,057 | B1 * | 3/2003 | Houle | B01D 21/2455 210/104 |
| 7,426,769 | B2 * | 9/2008 | Mensch | B08B 5/04 15/340.1 |
| 7,797,789 | B2 * | 9/2010 | Nuhn | A01K 1/0103 15/340.1 |
| 7,972,517 | B1 * | 7/2011 | Miller | B30B 9/22 210/710 |
| 8,889,016 | B2 * | 11/2014 | DeWaard | B01D 33/06 210/803 |
| 9,597,618 | B2 * | 3/2017 | DeWaard | B01D 33/72 |
| 10,473,513 | B2 * | 11/2019 | Hansen | G01G 23/14 |
| 2003/0057160 | A1 * | 3/2003 | Williams | A01C 3/02 210/718 |
| 2006/0138054 | A1 * | 6/2006 | Menke | C02F 11/125 210/703 |

(Continued)

*Primary Examiner* — Nina Bhat
(74) *Attorney, Agent, or Firm* — Williams Kastner & Gibbs PLLC; Mark Lawrence Lorbiecki

(57) ABSTRACT

A method and an apparatus for receiving manure from a vacuum truck, as that manure is collected from alleys of a dairy barn, includes receiving the manure in a mixing basin. The received manure is diluted in the mixing basin with a jet of water discharging a sufficient volume of water to form a sand-laden manure flow having a velocity of over 3 feet per second and dilute the received manure into a sand-laden manure suspension of less than seven percent manure solids. The resulting sand laden manure suspension is conducted into a vestibule of a sand settling lane to slow the flow of the sand laden manure suspension to enter a sand settling lane at a velocity of less than 1.25 feet per second. Sand is collected in the sand settling lane.

20 Claims, 5 Drawing Sheets

(56) References Cited

U.S. PATENT DOCUMENTS

| | | | | |
|---|---|---|---|---|
| 2007/0245512 A1* | 10/2007 | Mensch | ............... | B08B 9/08 15/340.1 |
| 2009/0293911 A1* | 12/2009 | Nuhn | ............... | A01K 1/0128 134/6 |
| 2010/0044279 A1* | 2/2010 | Tucker | ............... | B03B 5/26 209/10 |
| 2014/0124000 A1* | 5/2014 | Hillforth | ............... | A01K 1/0128 134/6 |
| 2015/0274556 A1* | 10/2015 | Church | ............... | B01J 20/02 210/710 |
| 2016/0106057 A1* | 4/2016 | DeWaard | ............... | B65D 88/54 210/702 |
| 2019/0270090 A1* | 9/2019 | Coulton | ............... | B03B 5/623 |

\* cited by examiner

ALLEY VACUUM DUMPING RECEPTACLE FOR MANURE DILUTION

FIELD OF THE INVENTION

The method and system implicates manure composting technology for dairy barns, specifically conveying sand-free manure to composters.

BACKGROUND OF THE INVENTION

In the U.S., most large dairy farms operate free stall barns where the cows can move around and choose where to lie down and where they may stand along the feed bunk to eat. Cow comfort is a key ingredient to high milk production and ultimately producer profitability. Because, apart from eating, reclining makes up a the greatest part of the cow's day. Thus, finding optimal bedding is a concern of the dairy producer.

Sand remains the free stall bedding of choice among dairy producers and veterinarians. Sand is preferred as it readily conforms to the body of the reclining cow while providing sure footing to the cow when rising from a recumbent posture. Clean sand provides no shelter or food for microbes that might cause disease. The most common component of sand is silicon dioxide in the form of quartz. Quartz is hard, insoluble in water, formed in crystalline structures with flat faces terminating in sharp edges that do not decompose easily from the weathering processes. Such a crystal provides no purchase for microbes. Thus, sand can provide hygienic and comfortable bedding for cattle without providing a host medium for microbes especially as to the scourge of the dairy, the infection of cow teats known as mastitis.

Mastitis causing organisms require food (carbon source), water, and heat to thrive and survive. Properly selected or separated bedding sand contains minimal organic matter. Less organic matter also translates to less moisture to support microbial growth as it is organic matter that tends to absorb and retain moisture while feeding the microbes. Organic beddings such as manure, straw, and wood products provide a very hospitable environment for such pathogens.

In addition to the hygienic advantage offered by use of sand as bedding, there are further positive physical attributes that give sand the nod. Organic material, especially when saturated with water can be slippery underfoot, possibly injuring the cow. A cow in the process of lying undergoes what resembles a controlled fall. To prevent injury, the hooves must allow the falling cow to brake its progress to the ground to prevent injury. Sand offers a cushiony surface because of its loose-packed nature, and a cow's drop onto such a surface in comparison to collision with a harder surface, thereby reducing stresses on knees and joints. By its abrasive qualities, sand offers surer footing when rising and moving about free stall alleys. Providing sand bedding ultimately increases the number of lactations a cow spends in the milking herd by reducing the need to cull due to stress, injury, and disease.

But, sand has its shortcomings as well. To understand the pervasive nature of sand in the operation of a dairy, one must understand how such a dairy is laid out. Each side of a free stall barn has one or more rows of bedded stalls which encourage cows to lie down and rest. Aisles separate the feeding area and rows of stalls. Cows generally will not deposit manure in their bedding, but they will track sand into their manure. Most of the manure is deposited in the aisles. Because cows spend most of their time eating, manure is plentiful. It must be collected to allow the dairy to function efficiently.

While the volume of sand laden manure produced by any one operation will vary with breed of cattle, level of milk production, sand type, and sand use rate, the volume of sand laden manure an active dairy produces is always such that the cost of disposal or use of that manure is a significant economic factor in operation. Modern dairies seek to avoid moving manure off-site in favor of on-site processing to either compost or digest it. Sand and water are inert ingredients that add greatly to the expense of off-site disposal. Even in processing on the dairy, the sand is merely an inert ingredient that interferes with those processes and wears the machinery. Removing the sand at the earliest opportunity saves money and produces a better manure for downstream processing or transport.

The amount of sand within a volume of manure 1 an active dairy can produce is impressive. Consider, for example, a 1,000 cow dairy uses sand at a rate of 50 lb./cow/day. Assuming, 5% bypass, 2,500 lb. sand/day—almost one cubic yard or 200 gallons/day would be introduced to the volume of manure daily. In addition to bedding sand, manure 1 contains grit from other sources, such as blow sand, degrading concrete, soil from harvesting, etc. Grit from these other sources is often overlooked by designers and requires some sort of grading by size to recover the appropriate bedding sand.

Sand used in free stalls barns generally varies from 52 to 82 pounds of sand per stall per day with a mean of 68 pounds of sand per stall per day Similarly, manure production from dairy cows (excluding bedding) is on the order of 82 to 84 pounds of manure per 1,000 pounds of animal weight. Therefore, the amount of manure 1 produced by a 1,400-pound dairy cow ranges from 115 to 118 pounds per day. Addition of 50 to 60 pounds of sand bedding per day results in about 165 to 178 pounds of sand laden manure per 1,400-pound cow per day. Thus, the sand laden manure, as it leaves the vacuum truck carries a great volume of sand even relative to the volume of manure particles that makes up the sand laden manure. Economics dictates the desirability of recovery of sand from sand laden manure prior to disposal of the manure.

In free stall barns, manure is removed from the alleys at least once per day and possibly more often using one of three methods: flushing, scraping, or vacuum tanker. Due to economic and design factors, the vacuum collection of manure is gaining favor among dairy producers. Dairy producers using vacuum tankers have reported a number of benefits over either of scrape or flush dairy operations, including a decrease in flies, suppression of odors, and water use, and have, likewise, noted an increase in herd health and production. For example, incidents of hoof disease and mastitis are down while the cows are cleaner and drier. Cows never have to walk in deep, wet manure. Additionally, dairy farmers report greater satisfaction because of the cleaner environs. The vacuum tanker or vacuum truck is a vehicle configured to remove manure from confinement areas using a powerful vacuum that collects manure in a tank or cannister. Once collected, the manure can be transported to storage or off the farm.

But, the manure contains urine and fecal matter, waste drinking water, waste feed and animal hair and, most significantly, sand. Sand presents a threat to any manure handling equipment used to convey sand-laden dairy manure. The same abrasive nature that allows cows to gain their footing the free stalls will also prematurely wear pumps and other equipment used for movement and storage of manure within a modern dairy. For the sake of the equipment, the further upstream the sand is removed, the better the for the efficiency of the dairy; the less the machinery is required to move sand laden manure the less the wear on that manure handling machinery. So, once the vacuum truck collects the manure, it would be desirable to remove the sand from it before any other significant processing thereof.

An advantage of vacuum trucks is that they collect the manure in its densest form, collecting it "as excreted" manure without also collecting the additional water flushing introduces. The manure occupies the tank of the vacuum truck in its most compact state, extending the capacity of the vacuum truck to its practical limit. For example, a popular tank allows the vacuum truck to collect approximately 4000 gallons per load. Unfortunately, bedding sand and tracked sand are also collected with the manure and cannot be readily separated therefrom at the collection stage.

Conventional means for stripping sand from manure prior to anaerobic digestion come at a cost. Often in terms of water dilution of manure. Most efforts, such as centrifugal separation have proven to be economically prohibitive. It is because of this expense that some dairy producers elect not to bed with sand. On the other hand, centrifuging manure to produce solid sand sediment and dilute manure has proven advantageous as dilute manure may be used as feedstock, for example, composters and anaerobic digesters. Nonetheless, the costs in terms of water and energy tend to place this outside of the economic means of most dairies.

What is needed in the industry is a means of receiving manure from vacuum trucks, removing the sand from the manure in a single economical process.

SUMMARY OF THE INVENTION

A method and an apparatus for receiving manure from a vacuum truck, as that manure is collected from alleys of a dairy barn, includes receiving the manure in a mixing basin. The received manure is diluted in the mixing basin with a jet of water discharging a sufficient volume of water to form a flow sand-laden manure suspension having a velocity of over 3 feet per second and also sufficient to dilute the received manure into a sand-laden manure suspension of less than seven percent manure solids. The resulting sand laden manure suspension is conducted into a vestibule of a sand settling lane to further slow the flow of the sand laden manure suspension to enter a sand settling lane at a velocity of less than 1.25 feet per second. Sand is collected in the sand settling lane. Gravity urges the sand from the sand-laden manure suspension as it flows through the sand settling lane to present a flow of dilute sand free manure at a manure at a conduit a sand settling weir defines. The dilute sand free manure is available as feedstock for an anaerobic digester for digestion.

The receiving basin includes a receiving basin grate situated at a lowest point within an interior the receiving basin defines, the receiving basin grate, itself, defining a number of holes of a grate diameter. The receiving basin grate strains the received manure to remove all solids having a diameter of greater than the grate diameter. A vestibule is used to conduct the sand laden manure suspension into a sand settling lane; the vestibule is configured to slow the flow to a velocity of less than 1.25 feet per second as that flow enters a sand settling lane. As the sand-laden manure flows from the mixing basin to the vestibule, the flow passes through a rock trap. The rock trap collects such gravel as may settle out as the sand laden manure flows from the mixing basin through the rock trap to the vestibule.

In some embodiments, an optional flush actuator includes a scale for sensing a weight of a vacuum truck on a vacuum truck deck. The flush actuator relies upon a processor that retrieves a value representing a volume of manure the vacuum truck contains based upon the sensed weight of the vacuum truck as that volume of manure is stored in a look-up table in association with a value of the sensed weight.

In embodiments of the invention, the flush actuator sensing a vacuum truck identity using a sensor which is either of a bar-code camera for reading a bar code the vacuum truck displays or an RFID scanner for reading an RFID tag the vacuum truck wears. Having sensed an identity, the flush actuator retrieves a volume of manure stored from a look-up table in association with the sensed vacuum truck identity.

When diluting the received manure in the mixing basin, in some embodiments, the flush actuator initiates the diluting of the received manure by activating a valve to release a volume of water into the mixing basin. The volume used for dilution is a value retrieved from a look-up table associated with a volume of manure the vacuum truck discharges into the mixing basin. The initiation of that dilution is in response to either activating a control switch or sensing a flow of manure from the vacuum truck with a manure camera focused upon the flow into a receiving basin. When the manure begins to flow from the truck, in a presently preferred embodiment, a pool of water is retained to enhance mixing to assist in dilution and to inhibit breeding of flies and propagation of odors.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
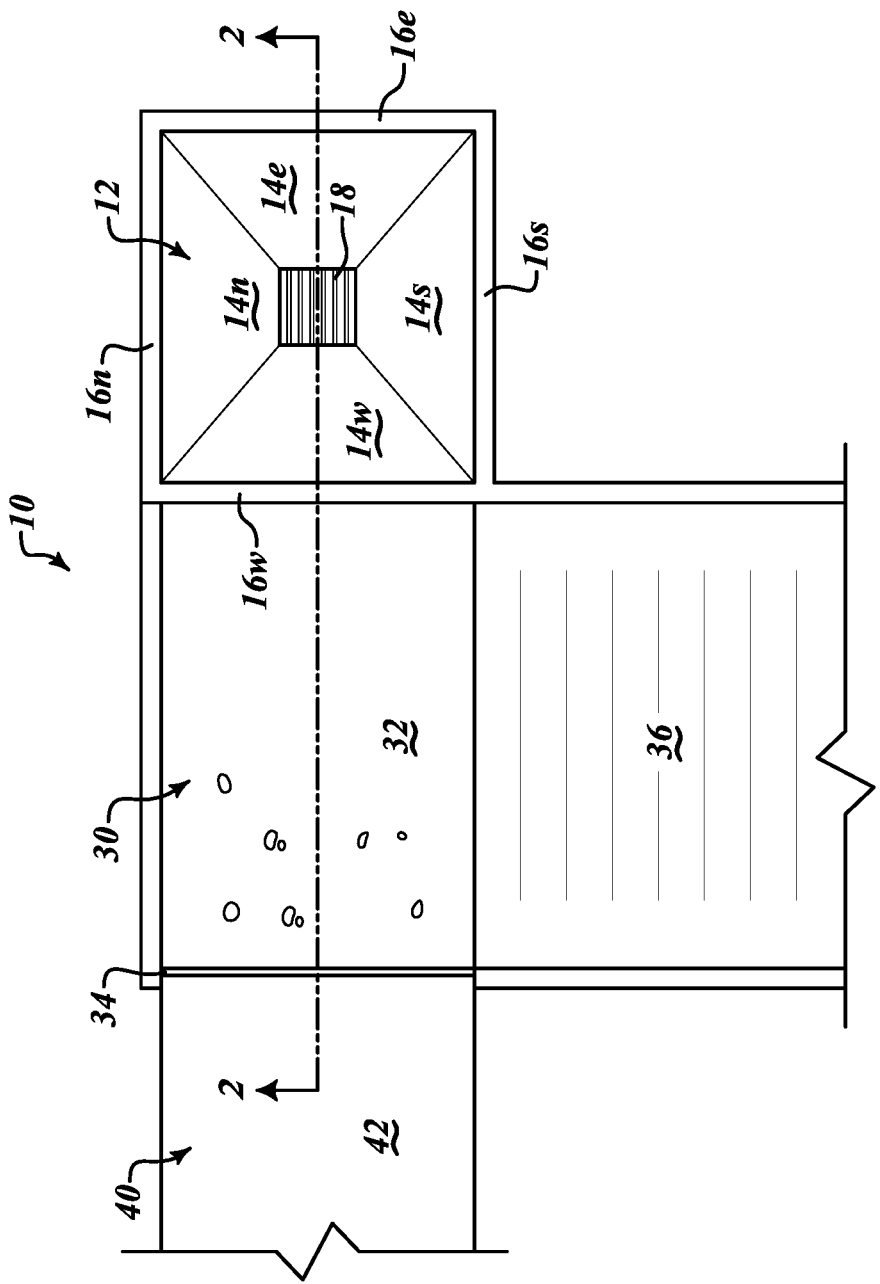
FIG. 1 is a plan-view of an exemplary alley vacuum truck dump receptacle along with a rock trap and a higher end of a sand lane.
Figure 2:
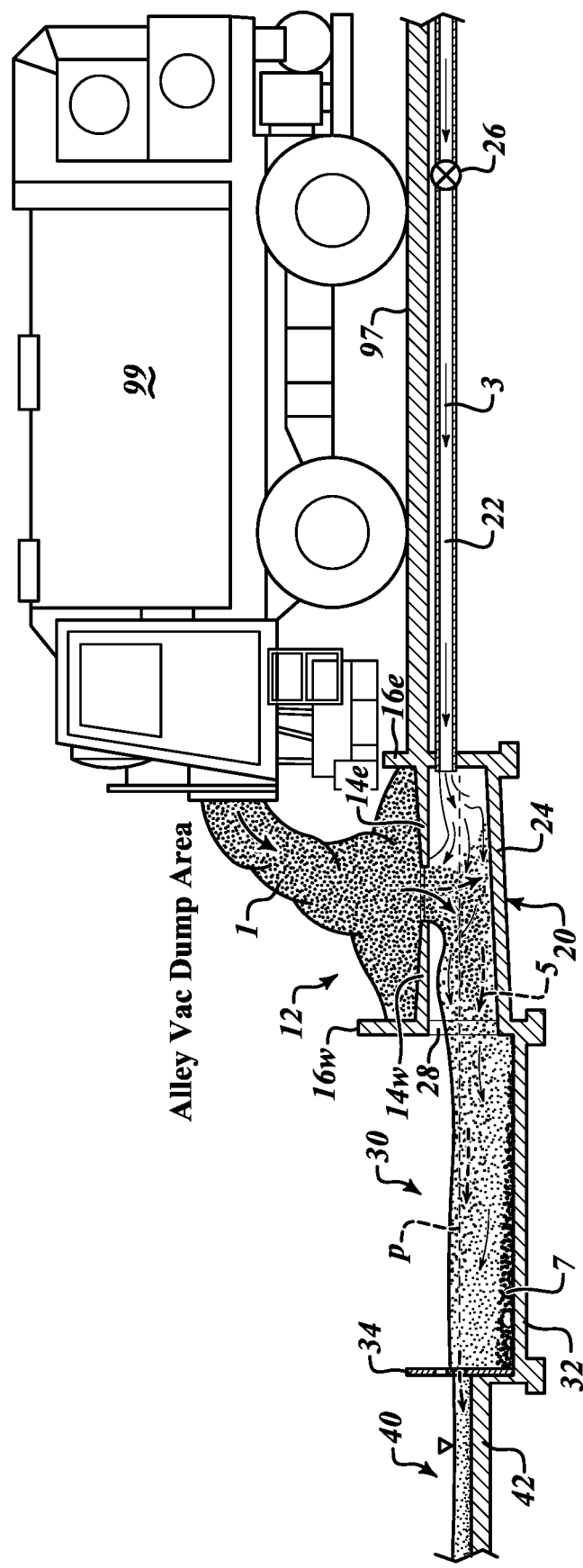
FIG. 2 is a cross-section view of the exemplary alley vacuum truck dump receptacle along with the rock trap and the higher end of the sand lane.

To condition the manure 1 for movement from a dumping site, it must be made dilute to a concentration that will allow entrained sand to pass out of suspension. FIGS. 1 and 2 depict a plan view and a cross-sectional view (respectively) of the inventive alley vacuum dumping receptacle assembly 10 for manure dilution receptacle into which the vacuum truck discharges its collected manure 1. The receptacle assembly 10 includes a shallow receiving basin 12 which in this exemplary case is made up of four sloping panels 14*n*, 14*e*, 14*s*, and 14*w* each having their respective lip elements 16*n*, 16*e*, 16*s*, and 16*w*. The receiving basin 12 is configured to funnel manure 1 issuing from the vacuum truck into a mixing basin residing below a receiving basin grate 18. The receiving basin grate 18 has openings for straining the manure 1 to remove larger solids such as gloves and large stones from the manure 1. The receiving basin grate 18 is configured to admit only solid objects of a selected size, in this example, having diameters of less than two inches. Separating only the greatly larger solids promotes ready flow through the receiving basin grate 18 to prevent clogging while unloading manure 1 as such clogging might occur with a receiving basin grate 18 with smaller openings.

Notably, in this example of a receiving basin 12, lip elements 16*n,* 16*e,* 16*s,* and 16*w* are present on all four sides in order to catch manure 1 and allow slight backups behind the receiving basin grate 18 without overflowing the receiving basin 12. Other embodiments are possible. For example, in another embodiment, the basin is recessed into the deck 97 allowing the use of a stream of water from a hose to drive any spilled manure 1 back into the receiving basin 12. In the illustrated embodiment an exemplary lip element 16*e* adjacent to the truck deck 97 is stepped slightly below the remaining three lip elements 16*n,* 16*s,* and 16*w* to allow the vacuum truck 99 to drive closer to the receiving basin 12 and also allows the remaining three lip elements 16*n,* 16*s,* and 16*w* to form a backstop to direct the flow of manure 1 from a screw conveyor used to empty the vacuum truck 99 into the receiving basin grate 18. In any embodiment, the sole purpose of the receiving basin 12 is to receive the manure 1 from the vacuum truck 99 as a hopper to direct manure 1 through the receiving basin grate 18 and into the mixing basin 20.

As discussed above, dilution to a particular solid concentration is an object of the invention. This occurs in the mixing basin 20. The capacity of the various vacuum trucks is known. For example, in one manufacturer's line of trucks (Mensch Manufacturing™), three models, i.e. the V-2510, the V-3410, and the V-4500 have respective capacities of 2200 gal., 3000 gal., and 4300 gal. Knowing the manure 1 to be "as excreted", one can readily calculate that at least an equal volume of water will bring the manure 1 to a solids concentration suitable for use such as in composting or digesting in an anaerobic vessel. Exact proportions will be based upon known variables such as breed of cattle, nature of feed, and cattle water consumption. But, these are known to the dairy managers and are either known or monitored in husbanding the herd. Thus, the volume of any charge of water 3 for dilution of manure 1 is known and repeatable.

In one embodiment of the inventive receptacle, a reservoir of water 3 is stored for flushing, the volume of which is selected to correspond to the capacity of one of the vacuum trucks. When the vacuum truck 99 begins to empty its load of manure 1 into the receiving basin 12, the inventive receptacle releases water 3 into the mixing basin 20 through a valve 26 in a water pipe 22. The water pipe 22 is configured to direct a jet of water 3 to meet and mix, thereby to dilute the manure 1. In another embodiment, metered charges of water of a specified volume can be admitted through the valve 26 to suitably dilute the manure 1. Whether by discharging water 3 through the water pipe 22 from a measured reservoir, using a timer, or through a water meter, the measured volume of water 3 suitably dilutes the manure 1 to form a sand-laden suspension of manure 5.

Separation of sand from liquid manure 1 generally requires adequate dilution to allow the sand to settle. Advantageously, the water 3 used to dilute the manure 1 as a preparation for anaerobic digestion can be the same water 3 used for dilution for digestion. For separation to occur, the added water for dilution must be sufficient to allow the sand particles and rocks to move past the manure particles and descend unimpeded to the bottom of the water column. Dilution allows larger particulate to settle first. The greater the dilution, the smaller the particulate that settles out. Research has shown that for bedding-grade sand and manure to separate by settling, at least two parts of water must be added to one part of sand laden manure by weight. In practice, dilution ratios of 2:1 to 5:1 can be used to achieve separation of sand 9 from dairy manure 1. As a result, the higher the dilution rate, the faster and better the sand separation. Importantly, selecting velocity of a sand laden manure suspension 5 along with dilution can allow selective separation wherein a higher velocity movement will keep smaller particulate such as sand entrained and will allow larger particulate such as gravel 7 to drop from the suspension.

Returning, then, to the inventive receptacle assembly portrayed in FIGS. 1 and 2, the mixing basin 20 is the situs of that necessary dilution. As the flush water 3 issues from the valve 26 through the water pipe 22 into the mixing basin 20 and as the manure 1 impacts the basin floor 24, the resulting turbulence that collision sets up serves to enhance the mixing of issued water 3 with manure 1. Still further, to prevent propagation of maggots and, therefore flies, the mixing basin 20 retains a pool of water 3 behind the metering bulkhead 34 therein so that undiluted manure 1 cannot reside therein. As can be readily apprehended, in the illustrated embodiment, water 3 is retained, at all times, at a level p behind the metering bulkhead 34 and beneath a weir 39, lower holes 37 and upper holes 38 that the metering bulkhead 34 defines. Holding this water 3 in the mixing basin 20 insures that as the manure 1 is discharged, it is broken up on impact with the basin floor 24 and desired dilution begins.

Figure 3:
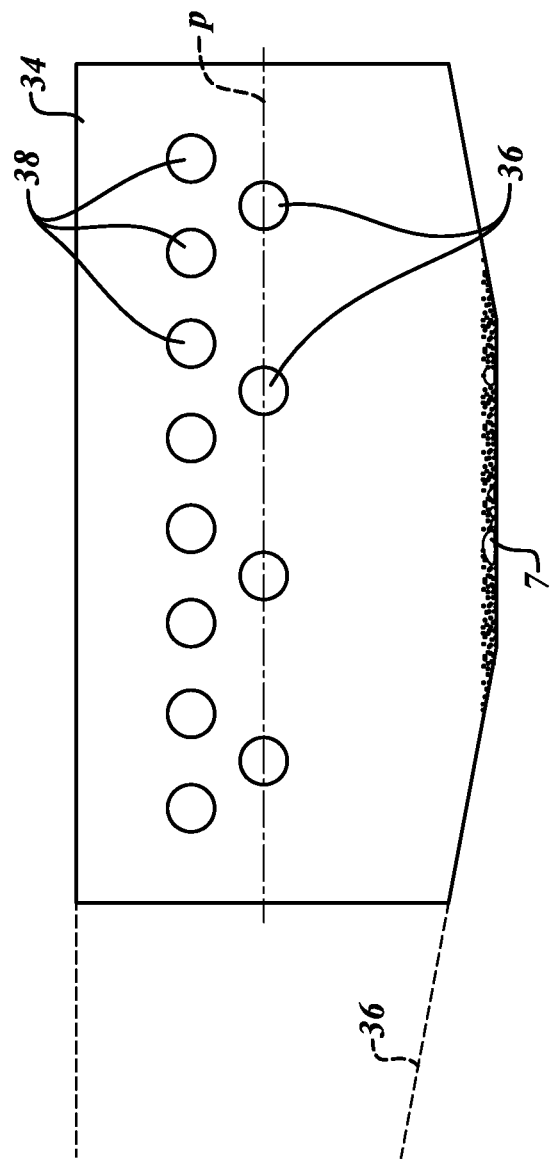
FIG. 3 is a rear elevation view of a metering wall which retains a pool of water in the vacuum truck dump receptacle.

As additionally depicted in FIG. 3, the metering bulkhead 39 performs several very important functions relative to the alley vacuum dumping receptacle assembly 10. First, it forms an impervious wall to complete the mixing basin 20 thereby to retain water behind it, the metering bulkhead 34. The lower holes 37 in the metering bulkhead 34 set the static upper boundary of the pooled water in the mixing basin 20. The water in the mixing basin 20 and rock trap 30 pool at a height p which corresponds to the height of a lower edge of the row of lower holes 37. Second, as a semi permeable barrier, the metering bulkhead 34 encourages roiling mixture of the manure 1 and water 3; given the high kinetic energy of water blasting forth from the conduit 22, some of the flow of water 3 strikes the solid part of the metering bulkhead 34 and turns it back against the flow and further roils the water 3 in the mixing basin 20. All of this roiling entrains most of the sand and allows the small gravel 7 to drop from the suspension 5 while the sand ultimately continues on through the metering bulkhead 34. Third, the upper holes 38 and the defined weir 39 provide a slowing device without allowing water 3 to overwhelm the mixing basin 20. The weir 39 allows all water exceeding its height to spill over; the upper holes 38 present far more unobstructed cross-section to the onrushing water 3 allowing a far greater volume of water 3 to pass through the metering bulkhead 34 but not so much as to simply overflow the weir 39. Thus, the mixing within the mixing basin 20 and on into the rock trap 30 exploits both the volume and the kinetic energy contained in the sand laden manure suspension 5 retained behind the metering bulkhead to produce a flow of water 3, manure, and entrained sand through the metering bulkhead 34 will allowing gravel 7 to drop from the sand laden manure suspension 5. With the larger volume of the rock trap 30, the high energy of the flow of the sand laden manure suspension 5 strikes the metering bulkhead 34 as well as such of the sand laden manure suspension 5 that bounces off of the metering bulkhead 34, thereby enhancing a mixing roiling within the rock trap 30. The roiling exploits the viscosity of the sand laden manure suspension 5 such that some of the sand laden manure suspension 5 passes through the metering bulkhead 34 and some bounces back into the rock trap 30 setting up more turbulent roiling. This roiling allows the sand laden manure suspension 5 to slow sufficiently to give up rocks and gravel 7 in the rock trap 30 while carrying sand and manure through the metering bulkhead 34. The decreased velocity allows that larger heavier gravel 7 to drop to collect as a pile on the rock trap floor 32 within the rock trap 30.

The rock trap 30 is a basin that the rock trap floor 32, walls, and the metering bulkhead 34 together define. As shown in FIG. 1, a ramp 36 facilitates removal of settled gravel 7 from the rock trap 32 with equipment such as a front loader. Releasing the larger, gravel 7 along with any other denser foreign solids such as screws, nails and other metal objects by allowing these to settle in the rock trap 32, the remaining sand laden manure suspension 5 flows through holes 37, 38 in the metering bulkhead 34 to enter a sand settling lane 40 at the sand lane vestibule 42.

The inventive receptacle assembly 10 exploits its ability to slow the flow of sand laden manure suspension 5 due the cooperative effects of the metering bulkhead 34, the rock trap 30 and the sand vestibule 42. The great kinetic energy of the sand laden manure suspension 5 is exploited to cause roiling and to pass the sand laden manure suspension 5 into the vestibule 42 of the sand lane 40 at a much lower velocity than that by which the water 3 is initially jetted into the mixing basin 20. By the time the sand laden manure suspension makes its way through any of the lower holes 37 and where the volume allows it, the upper holes 38 and, ultimately, the weir 39, the flow is spread across the vestibule allowing further viscous slowing of the sand laden manure suspension 5. By virtue of the metering bulkhead 34, the sand laden manure 5 enters the sand lane at the very much slower speeds to allow settling of entrained sand. The purpose of the sand settling lane 40 is to allow the further the settling of sand 9 from the sand laden manure suspension 5, preparing that sand laden manure suspension 5 for digestion. To that end, the metering bulkhead 34, the rock trap 30 and the sand vestibule 42 cooperate to so slow the sand laden manure suspension 5 that only the manure 1 solids remain in suspension as that flow ultimately leaves a sand settling lane 40.

Figure 4:
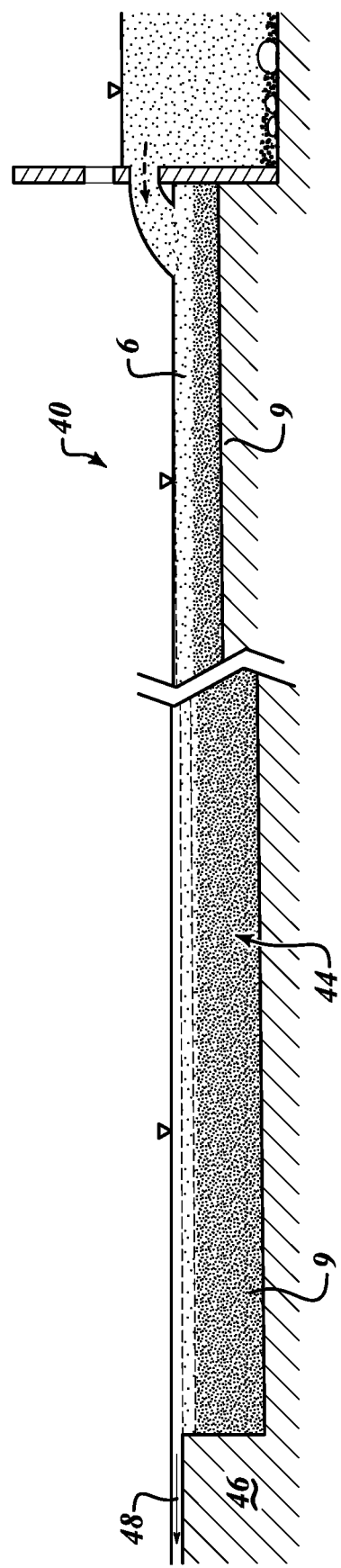
FIG. 4 is a cross-section view of an exemplary sand lane and vestibule.

FIG. 4 depicts a cross-section view of the sand settling lane 40. A sand settling lane 40 is a long, shallow channel designed to receive the now slowed sand laden manure suspension 5 from a velocity of over 3 feet per second to a velocity of less than 1.25 feet per second. The slower velocity of the sand laden manure suspension 5 is to allow any sand to settle while the organic solids the manure 1 comprises will remain in suspension until they exit the sand settling lane 40 at a manure conduit 48. From the vestibule 42, the sand laden manure suspension 5 enters the sand settling lane 40. The sand 9 settles into a sand settling basin 44 leaving only dilute sand-free manure 6 flowing above and past the settled sand 9. The vestibule 42 may, optionally, include a concrete block wall, stem wall, or a baffle to further slow the sand laden manure suspension 5. So configured, such a vestibule 42 will provide a desired sheet-like flow into the sand settling lane 40 flowing several feet downstream over the vestibule 42. The design of the vestibule 42 is selected to slow to significantly slow the flow to a velocity of about 1.25 feet per second ideal for maintaining the organic matter in the sand laden manure suspension 5. Manure particles will settle at flow velocities less than 1 foot per second. Flow velocities less than 0.3 foot per second provide settling conditions that closely approximate that of still (quiescent) wastewater. Velocities greater than 3 feet per second are generally high enough to prevent settling of sand particles. As the purpose of the sand lane 30 is to allow sand and grit to settle while maintaining organic solids in suspension the flow velocity throughout the sand settling lane 40 must be maintained in the range of 0.75 to 1.25 feet per second. The optimal flow velocity is selected in accord with Manning's equation and as a result the lane width and slope are critical parts of sand settling lane 40 design. The amount of time allowed for sand settling is controlled by the sand settling lane 40 length.

The sand settling lane 40 is configured as a long sloping sand settling basin 44, may optionally be configured with a width to correspond with that of the bucket of a front loader so that sand 9 may be removed from the sand settling lane 40 with a single pass. In an exemplary dairy, this sand removal might be required each 1 or 2 days and the collected sand may be removed to a concrete pad (not shown) for drying and conditioning. To complete the dewatering of the sand, the concrete pad may typically be sloped toward the sand lane so that leachate and runoff from the removed sand may return to the sand lane to rejoin the sand laden manure suspension 5. To the extent that removed sand still contains too much organic matter to be appropriately reused for bedding, the sand, itself can be replaced within the sand settling lane 40 closest to the vestibule 42 in a thin layer thereby allowing the incoming sand laden manure suspension 5 to rinse that sand thereby to allow manure solids and other organics to be washed from the sand during subsequent uses of the sand settling lane 40. Optionally the inventive receptacle assembly 10, mixing basin 20, rock trap 30 and sand settling lane 40 may be constructed in pairs. Any one of the paired sand settling lanes 40 being placed in use while the other sand settling lane 40 is being cleaned providing a continual regular flow of feedstock as dilute sand-free manure 6 to the anaerobic digester 50.

As the dilute sand-free manure 6 leaves the sand settling lane 40 to surmount the exit sand settling weir 46 it enters a manure conduit 48. While the manure conduit 48 is depicted as only a pipe in FIG. 3, this is not to suggest that there are no pumps or other manure handling devices within the manure conduit 48. The presence of such pumps and handling equipment is in accord with conventional design for movement of manure. The lack of specific placement of these devices is not to be interpreted as an assertion that these devices are neither necessary nor helpful but that the placement and presence of these devices would merely have made the illustrated presentation of the remaining features unduly confusing, so they have been omitted for clarity's sake.

Figure 5:
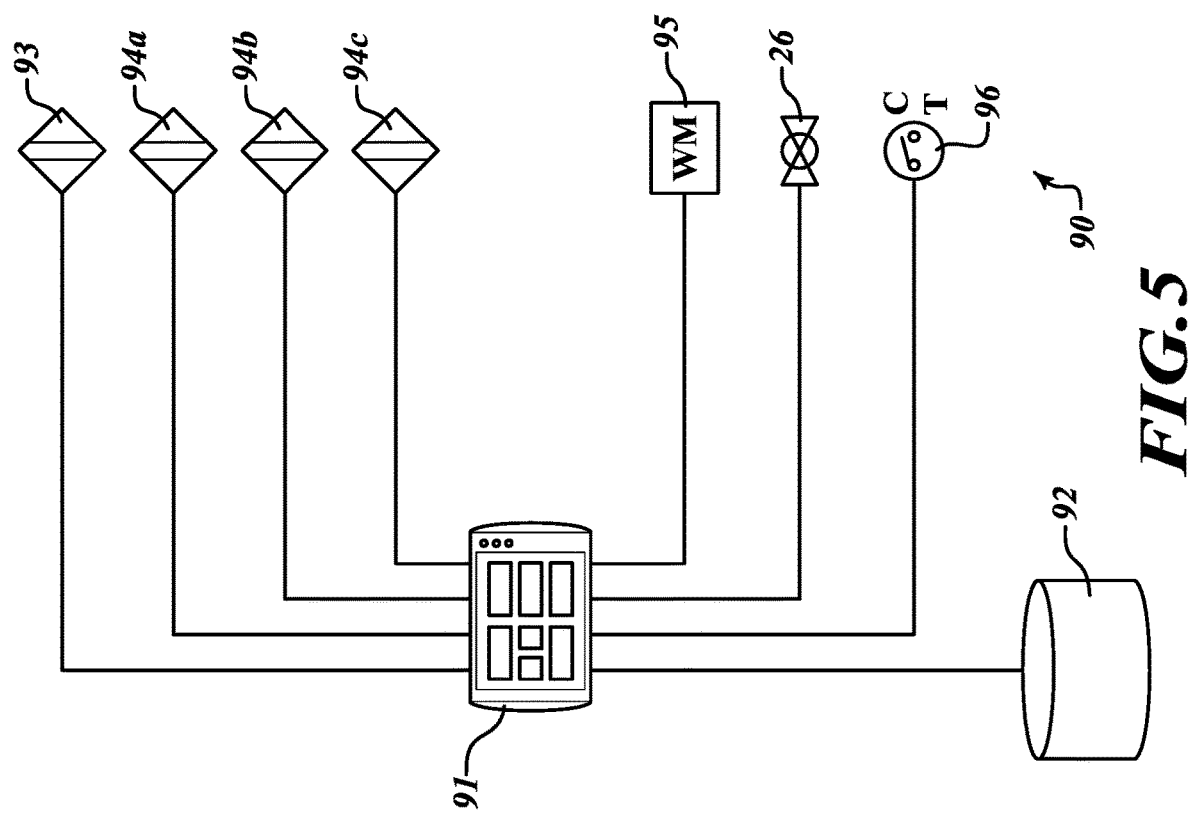
FIG. 5 is a block diagram of a controller used to open a flushing valve to release an optimal diluting volume of water into the vacuum truck dump receptacle.

Moving then to FIG. 5, an optional flush actuator 90 is presented. While in some embodiments of the invention, the valve 26 simply releases a charge of water in response to activation of a control switch 96. For a vacuum truck 99 of a known volume, the volume of an optimal charge of water 3 for dilution is squirted by the valve 26 into the mixing basin 20. These embodiments can provide optimal results where a single vacuum truck 99 of a fixed capacity is employed on the dairy. In these embodiments, the optimal charge of water 3 bears a fixed relation to the volume of manure 1 the fully loaded vacuum truck 99 contains. This optimal volume of water 3 is based upon the vacuum truck's 99 full payload of vacuumed "as excreted" manure 1 and there is no need for any variability relative to the volume of water 3 to achieve optimal dilution.

In other embodiments, the flush actuator 90 allows for employment of various distinct vacuum trucks 99 and thus to provide the matching of various volumes of water 3 to such weight of manure 1 as each vacuum truck 99 might contain thereby to optimally dilute with a suitable volume of water 3. By way of explanation of the invention, the flush actuator 90 in some embodiments is augmented by cameras, 94a, 94b, and 94c. When the vacuum truck is on the deck 97, the signal from the scale 93 is sent to the processor 91. The processor 91 then starts to look to the camera 94a which recognizes the positioning of the vacuum truck 99.

Once the positioning camera 94a in concert with the processor 91 recognizes the vacuum truck 99 as being position on the deck 97, the processor 91 asks a bar-code camera 94b to read a bar-code on the vacuum truck 99 to inform the processor 91 as to the type and capacity of the vacuum truck 99. Often, this is accomplished when the processor 91 and the bar-code camera 94b acting in conjunction with the look-up table 92 where bar-codes are stored in relation with the vacuum truck 99 identity. Alternately, the bar-code camera 94b is, instead, an RFID reader which performs the role of the bar-code camera 94b but rather than optically, with radio waves, reads an RFID tag on the vacuum truck 99 to identify the capacity of the vacuum truck 99.

Finally, a manure camera 94c indicates when the vacuum truck 99 begins its emptying of manure 1 into the receptacle assembly 10. Once the manure camera 94c and processor 91 recognize the emptying flow of manure 1 into the receptacle assembly 10, the processor 91 activates the valve 26 to release the appropriate volume of water as is described above, in reference to any information discerned by the bar-code camera 94b in conjunction with processor 91 and the look-up table 92. Water 3 is admitted to the mixing basin 20 in a proper volume to suitably dilute the manure 1 issuing from the vacuum truck 99. In this embodiment, no separate control switch 96 is necessary to trigger the release of water 3; the processor 91, with knowledge of the volume of manure 1 the vacuum truck 99 contains, initiates dilution when the manure camera 94c recognizes the flow of manure 1.

In one further embodiment, the deck 97 includes a truck scale sensor 93 which weighs the vacuum truck 99. The processor 91 receiving a signal from the truck scale sensor 93 and discerning the weight the signal communicates, the processor 91 draws value representing a volume of "as excreted manure 1" and the valve 26 is activated to admit a volume of water 3 the volume drawn from the look-up table 92. Where a reservoir is not used to measure that contained volume of water 3, in an alternate embodiment, when the control switch 96 is activated, the processor 91 sends a signal to the valve 26 which, in turn, admits a volume of water 3 as the magnitude of that volume is drawn from the look-up table 92. The valve 26 is able to close once the water meter 95 measures that volume from the look-up 92 table as having passed through the valve 26 and into the mixing basin 20. The valve 26 closes in response to a signal from the processor 91.

By the means set out above, the receptacle assembly 10 receives manure 1 from the vacuum truck 99 and mixes and dilutes that manure 1 with a measured charge of water 3. Importantly, the charge of water 3 is selected to precondition manure 1 both to enable settling of sand 9 from the manure 1 and to suitably dilute the manure 1 to be suitably digested in an anaerobic digester 50. By introducing the water 3 immediately at the point of discharging the manure 1 from the vacuum truck 99, sand 9 can be removed from the manure 1 at an advantageous juncture. Use of the instant invention removes sand from downstream handling thereby minimizing wear on such pumps and machinery as is used to move the manure 1 into the digester 50.

The invention claimed is:

1. A method for separating sand from manure received from a vacuum truck, the manure having been collected from alleys of a dairy barn through operation of the vacuum truck, the method comprising:
    retaining a volume of water behind a metering bulkhead forming one wall of a mixing basin;
    receiving the manure in the mixing basin;
    diluting the received manure in the mixing basin with a jet of water discharged in a sufficient volume to form a sand-laden manure flow having a velocity of over 3 feet per second and including less than seven percent manure solids;
    conducting the sand-laden manure suspension into a vestibule of a sand settling lane to slow the flow of the sand-laden manure suspension to enter a sand settling lane at a velocity of less than 1.25 feet per second; and
    reclaiming sand from the sand settling lane, gravity having urged the sand from the sand-laden manure suspension as it flows through the sand settling lane to present a flow of dilute generally sand-free manure at a manure at a conduit a sand settling weir defines.

2. The method of claim 1 wherein the receiving the manure in a mixing basin further comprises:
    straining the manure through a receiving basin grate to remove all solids having a diameter of greater than the grate diameter, the receiving basin grate being situated at a lowest point within an interior a receiving basin defines, the receiving basin grate, itself, defining a number of holes of a grate diameter.

3. The method of claim 1, wherein conducting the sand laden manure suspension into a vestibule of a sand settling lane to slow the flow of the sand laden manure suspension to enter a sand settling lane at a velocity of less than 1.25 feet per second further comprises:
    conducting the sand-laden manure flow through a rock trap the metering bulkhead defines; and
    collecting gravel within the rock trap, the gravel settling out of the sand-laden manure as it flows from the mixing basin through the rock trap to the vestibule.

4. The method of claim 1, wherein receiving the manure in the mixing basin further comprises:
    sensing a weight of a vacuum truck at a scale; and
    retrieving a volume of manure the vacuum truck contains based upon the sensed weight as that volume of manure is stored in a look-up table in association with a value of the sensed weight.

5. The method of claim 1, wherein receiving manure in the mixing basin further comprises:
    sensing a vacuum truck identity using a sensor selected from a group consisting of:
        a bar-code camera for reading a bar code the vacuum truck displays; and
        an RFID scanner for reading an RFID tag the vacuum truck wears; and
    retrieving a volume of manure stored in a look-up table in association with the sensed vacuum truck identity.

6. The method of claim 1, wherein diluting the received manure in the mixing basin further comprises:
    activating a valve to release the jet of water, a volume of the jet of water being retrieved from a look-up table based upon a volume of the received manure the vacuum truck discharges into the mixing basin, the activation being in response to one of a activation group consisting of:

activating a control switch; and sensing a flow of manure from the vacuum truck with a manure camera focused upon the flow into a receiving basin.

7. A receptacle assembly for receiving manure collected in a vacuum truck from alleys of a dairy barn, the receptacle assembly comprising:

a mixing basin defining, in series, an interior basin to include a mixing basin floor, a rock trap lip, a rock trap and a metering bulkhead which cooperate to retain a pool of water therein, and the interior basin to further to define an inlet from which to receive a jet of water, the mixing basin being configured to receive a volume of manure;

a water pipe to conduct the jet of water through the inlet into the interior basin, the water pipe of sufficient cross-section to allow the discharge of a sufficient volume of water into the mixing basin to form, when mixed with the volume of manure, forms a sand-laden manure suspension in a flow having a velocity of over 3 feet per second and also sufficient in volume to dilute the received manure into the sand-laden manure suspension of less than seven percent manure solids;

a vestibule of a sand settling lane connected to the mixing basin to receive the sand-laden manure suspension and connected to a sand settling lane, the vestibule configured to slow the flow of the sand-laden manure suspension to enter a sand settling lane at a velocity of between 1.25 feet per second to 0.75 feet per second in the sand settling lane;

the sand settling lane defining a settling basin to allow gravity to urge the sand from the sand-laden manure suspension as it flows through the sand settling lane thereby to present a flow of dilute sand-free manure at a manure conduit a sand settling weir defines; and the manure conduit to convey the dilute sand-free manure out of the sand settling lane.

8. The receptacle assembly of claim 7, further comprising:

a receiving basin including a receiving basin grate situated at a lowest point within an interior the receiving basin defines, the receiving basin grate, itself, defining a plurality of holes of a grate diameter.

9. The receptacle assembly of claim 8, wherein the receiving basin is situate above the mixing basin, the receiving basin grate being located such that the manure received in the receiving basin will strain through the holes to pass into the mixing basin, the grate configured to remove all solids having a diameter of greater than the grate diameter.

10. The receptacle assembly of claim 8, wherein the mixing basin further includes the rock trap, the rock trap configured to receive gravel as may settle out of the sand-laden manure suspension as it flows from the mixing basin through the rock trap to the vestibule.

11. The receptacle assembly of claim 8, the receiving basin further comprising:

a vacuum truck deck including a scale for sensing a weight of a vacuum truck upon the vacuum truck deck and generate a weight signal in response to the sensed weight;

a processor to receive the weight signal from the scale and a look-up table whereby the processor retrieves a water value indicating a volume of water necessary to dilute a volume of manure the vacuum truck contains, that volume of water based upon the received weight signal as that volume of water is stored in the look-up table in association with the value of the sensed weight, the processor to generate a water signal based upon the volume of water; and a valve to admit the volume of water through the water pipe, through the inlet into the mixing basin to dilute the volume of manure the vacuum truck contains.

12. The receptacle assembly of claim 8, wherein receptacle assembly further comprising:

a sensor to discern a vacuum truck identity and to generate an identity signal in accord with the discerned identity, the sensor selected from a group consisting of:

a bar-code camera for reading a bar code the vacuum truck displays; and an RFID scanner for reading an RFID tag the vacuum truck wears;

a processor configured to retrieve a value for a volume of manure the vacuum truck contains as that value is stored in a look-up table in association with the sensed vacuum truck identity; and a valve to admit the volume of water through the water pipe, through the inlet into the mixing basin to dilute the volume of manure the vacuum truck contains.

13. The receptacle assembly of claim 8, wherein further comprising:

a valve to release a volume of water into the mixing basin in response to an initiation signal, the initiation signal being generated in response to one of a group consisting of:

activating a control switch; and sensing a flow of manure from the vacuum truck with a manure camera focused upon the flow into a receiving basin.

14. A receptacle assembly for receiving a volume of manure collected in a vacuum truck from alleys of a dairy barn, the receptacle assembly comprising:

a mixing basin for receiving the volume of manure, the mixing basin including a water pipe having a valve to admit a water volume into the mixing basis in a measured volume, the water volume being selected to dilute the received volume of manure into a sand-laden manure suspension of less than seven percent manure solids;

a rock trap including a rock trap floor and a rock trap lip, the rock trap including a metering bulkhead selected to retain a pool of water to a pool level within the rock trap and mixing basin; and a sand settling lane defining a settling basin to allow gravity to urge the sand from the sand-laden manure suspension as the sand-laden manure suspension flows through the sand settling lane thereby to present a flow of dilute sand free manure at a conduit a sand settling weir defines.

15. The receptacle assembly of claim 14, the receiving basin further comprising:

a vacuum truck deck including a scale for sensing a weight of a vacuum truck positioned upon the vacuum truck deck and generate a weight signal in response to the sensed weight;

a processor to receive the weight signal from the scale and a look-up table whereby the processor retrieves a water value indicating a volume of water necessary to dilute a volume of manure the vacuum truck contains, that volume of water based upon the received weight signal as that volume of water is stored in the look-up table in association with the value of the sensed weight, the processor to generate a water signal based upon the volume of water; and a valve to admit the volume of water through the water pipe, through the inlet into the mixing basin to dilute the volume of manure the vacuum truck contains.

16. The receptacle assembly of claim 15, wherein receptacle assembly further comprises:
   a sensor to discern a vacuum truck identity and to generate an identity signal in accord with the discerned identity, the sensor selected from a group consisting of:
      a bar-code camera for reading a bar code the vacuum truck displays; and
      an RFID scanner for reading an RFID tag the vacuum truck wears;
   a processor configured to retrieve a value for a volume of manure the vacuum truck contains as that value is stored in a look-up table in association with the sensed vacuum truck identity and
   a valve to admit the volume of water through the water pipe, through the inlet into the mixing basin to dilute the volume of manure the vacuum truck contains.

17. The receptacle assembly of claim 15, further comprising:
   a valve to release a volume of water into the mixing basin in response to an initiation signal, the initiation signal being generated in response to one of a group consisting of:
      activating a control switch; and
      sensing a flow of manure from the vacuum truck with a manure camera focused upon the flow into a receiving basin.

18. The receptacle assembly of claim 15, wherein:
   the water pipe of sufficient cross-section to allow the discharge of a sufficient volume of water into the mixing basin to form, when mixed with the volume of manure, a sand-laden manure flow having a velocity of over 3 feet per second and also sufficient to dilute the received manure into a sand-laden manure suspension of less than seven percent manure solids; and
   the sand settling lane includes a vestibule connected to the mixing basin to receive the sand laden manure suspension and connected to a sand settling lane, the vestibule configured to slow the flow of the sand laden manure suspension to enter a sand settling lane at a velocity of less than 1.25 feet per second.

19. The receptacle assembly of claim 15, the receiving basin further comprising:
   a vacuum truck deck including a scale for sensing a weight of a vacuum truck upon the vacuum truck deck and generate a weight signal in response to the sensed weight;
   a processor to receive the weight signal from the scale and a look-up table whereby the processor retrieves a water value indicating a volume of water necessary to dilute a volume of manure the vacuum truck contains, that volume of water based upon the received weight signal as that volume of water is stored in the look-up table in association with the value of the sensed weight, the processor to generate a water signal based upon the volume of water; and
   a valve to admit the volume of water through the water pipe, through the inlet into the mixing basin to dilute the volume of manure the vacuum truck contains.

20. The receptacle assembly of claim 19, wherein the processor to receive the weight signal from the scale further includes a camera to sense initiation of manure flow from the vacuum truck into the mixing basin.

* * * * *

UNITED STATES PATENT AND TRADEMARK OFFICE
CERTIFICATE OF CORRECTION

PATENT NO. : 11,240,952 B2
APPLICATION NO. : 16/837705
DATED : February 8, 2022
INVENTOR(S) : David C. DeWaard It is certified that error appears in the above-identified patent and that said Letters Patent is hereby corrected as shown below:

In the Specification

Column 2, Line 64, should read, their footing in the

Column 3, Line 1, should read, the efficiency; Line 38, should read, flow of sand laden; Line 49, should read, a conduit Column 6, Line 60, should read, entrainded sand through the metering bulkhead while allow- Column 7, Line 62, should read, bule is selected to In the Claims Column 10 Line 66, Claim 6 should read, an activation being in response to one of an activation Signed and Sealed this
Twenty-fourth Day of May, 2022

Katherine Kelly Vidal
*Director of the United States Patent and Trademark Office*